(12) United States Patent
Yoshida et al.

(10) Patent No.: US 11,096,324 B2
(45) Date of Patent: Aug. 24, 2021

(54) FERTILIZATION DESIGN DEVICE, AGRICULTURAL TOOL, FERTILIZATION DESIGN METHOD AND FERTILIZATION DESIGN PROGRAM

(71) Applicant: TOPCON CORPORATION, Tokyo (JP)

(72) Inventors: Tsuyoshi Yoshida, Tokyo (JP); Noriko Saito, Tokyo (JP); Ryosuke Tomizawa, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 367 days.

(21) Appl. No.: 16/285,821

(22) Filed: Feb. 26, 2019

(65) Prior Publication Data

US 2019/0261551 A1 Aug. 29, 2019

(30) Foreign Application Priority Data

Feb. 27, 2018 (JP) .............................. JP2018-033376

(51) Int. Cl.
| | |
|---|---|
| *G08B 21/00* | (2006.01) |
| *A01C 21/00* | (2006.01) |
| *A01B 79/00* | (2006.01) |
| *G01S 19/13* | (2010.01) |

(52) U.S. Cl.
CPC .......... *A01C 21/007* (2013.01); *A01B 79/005* (2013.01); *G01S 19/13* (2013.01)

(58) Field of Classification Search
CPC ...... A01C 21/007; A01B 79/005; G01S 19/13

USPC .......................................................... 702/19
See application file for complete search history.

(56) References Cited

U.S. PATENT DOCUMENTS

| | | | |
|---|---|---|---|
| 2012/0101634 A1* | 4/2012 | Lindores | ............... A01B 79/005 |
| | | | 700/266 |
| 2012/0298847 A1 | 11/2012 | Hayashi et al. | |
| 2014/0288850 A1* | 9/2014 | Avigdor | ................. G05B 15/02 |
| | | | 702/19 |

(Continued)

FOREIGN PATENT DOCUMENTS

| | | |
|---|---|---|
| AU | 2017245116 A1 | 10/2018 |
| JP | 2012-247235 A | 12/2012 |

(Continued)

*Primary Examiner* — Marks S Rushing
(74) *Attorney, Agent, or Firm* — Chiesa Shahinian & Giantomasi PC

(57) ABSTRACT

A fertilization design device calculates a fertilization amount of a field to be fertilized and includes the following units. A database reception unit receives one or both of growth data indicating growth potential of the field and soil data indicating plant growth potential of soil in the field and receives position data as position coordinate information for the field. A designated position reception and retrieval unit receives a freely selected position designated by a user and retrieves information of the freely selected position from the position data. A user input fertilization amount value reception unit receives a fertilization amount value freely set by the user for the freely selected position or for a range including the freely selected position. A calibration curve generation unit generates a calibration curve, based on one or both of the growth data and the soil data, the position data, and the fertilization amount value.

12 Claims, 20 Drawing Sheets

(56) References Cited

U.S. PATENT DOCUMENTS

| | | | |
|---|---|---|---|
| 2015/0301536 A1* | 10/2015 | Martinez | G05D 11/138 |
| | | | 700/266 |
| 2017/0045488 A1* | 2/2017 | Riess | G01N 33/24 |
| 2017/0287082 A1* | 10/2017 | Karube | G06Q 10/06311 |
| 2018/0014452 A1* | 1/2018 | Starr | A01G 7/00 |

FOREIGN PATENT DOCUMENTS

| | | | |
|---|---|---|---|
| JP | 2017-184640 A | 10/2017 | |
| WO | WO-2017170984 A1 * | 10/2017 | ....... G06Q 10/06315 |

* cited by examiner

FERTILIZATION DESIGN DEVICE, AGRICULTURAL TOOL, FERTILIZATION DESIGN METHOD AND FERTILIZATION DESIGN PROGRAM

This application is based upon and claims benefit of priority from Japanese Patent Application No. 2018-033376, filed Feb. 27, 2018, the entire contents of which are incorporated herein by reference.

TECHNICAL FIELD

The present invention relates to a technique for applying fertilizer to a field.

BACKGROUND ART

A technique is known for generating a fertilization map, which is a map that indicates the amount of fertilizer for each place in a field, on the basis of growth data that indicates the growth state of plants or the like and position data that indicates the growth location of the plants or the like in the field (for example, see JP 2017-184640 A).

CITATION LIST

Patent Literature

JP 2017-184640 A

SUMMARY

Problem to be Solved by the Invention

Even now, the amount of fertilizer applied to each location of a field largely depends on intuition resulting from the experience of those who have managed the field over a long period of time, and calculating this intuition-based fertilization amount with a computer or the like requires the configuration of a very large number of parameters and the accumulation of enormous amounts of data, which is often difficult. Accordingly, an object of the invention is to provide a technique capable of reproducing fertilization amounts determined by the intuition of a user of the invention in all locations of a field using a simple method.

Means for Solving the Problem

The present invention provides a fertilization design device configured to calculate a fertilization amount of a field to be fertilized. The fertilization design device includes a database reception unit configured to receive one or both of growth data that indicates a growth level of plants in the field and soil data that indicates plant growth potential of soil in the field and to receive position data as position coordinate information of the field. The fertilization design device also includes a designated position reception and retrieval unit configured to receive a freely selected position designated by a user and to retrieve information of the freely selected position from the position data. The fertilization design device also includes a user input fertilization amount value reception unit configured to receive a fertilization amount value freely set by the user for the freely selected position or for a range including the freely selected position. The information of the freely selected position or the range is retrieved by the designated position reception and retrieval unit. The fertilization design device further includes a calibration curve generation unit configured to generate a calibration curve, based on one or both of the growth data and the soil data, the position data, and the fertilization amount value. The calibration curve has a lateral axis representing the growth data or the soil data and has a vertical axis representing the fertilization amount in a two-dimensional coordinate system.

In generating the calibration curve of the invention, multiple plot points may be determined in the two-dimensional coordinate system on the basis of one or both of the growth data and the soil data at a specific position and on the basis of a fertilization amount at the specific position, and a line that fits to the determined multiple plot points may be obtained as the calibration curve.

According to the present invention, one of the plot points may be obtained on the basis of an average fertilization amount in the field. In the invention according to claim 1, the fertilization design device may further include a calibration curve correction unit configured to perform parallel movement or change in an inclination or both of the calibration curve in accordance with a total amount of fertilizer to be applied to the field.

The calibration curve may be moved in parallel in a lower direction in a case in which the total amount of the fertilizer to be applied is less than a total amount of the fertilizer obtained from the calibration curve generated by the calibration curve generation unit. The calibration curve may be moved in parallel in an upper direction in a case in which the total amount of the fertilizer to be applied is greater than the total amount of the fertilizer obtained from the calibration curve generated by the calibration curve generation unit.

The fertilization design device may further include a fertilization map generation unit configured to generate a fertilization map, based on one or both of the growth data and the soil data, the position data, and the calibration curve. The database reception unit may receive map data generated on the basis of one or both of the growth data and the soil data and the position data. The fertilization design device may further include a data conversion unit configured to convert one or both of the growth data and the soil data, which are numerical data, and the position data, into map data.

The fertilization design device may further include a GNSS position specification unit configured to receive a navigation signal from a navigation satellite and specifies a position. The user input fertilization amount value reception unit may receive a fertilization amount value freely set by the user for a position specified by the GNSS position specification unit or for a range including a position specified by the GNSS position specification unit.

The present invention also provides an agricultural tool including a fertilizer device. The agricultural tool is configured to perform fertilization using the fertilization map output by the fertilization design device according to the present invention.

The present invention also provides a method for calculating a fertilization amount of a field to be fertilized. The method includes receiving one or both of growth data that indicates growth potential of the field and soil data that indicates plant growth potential of soil in the field and receiving position data as position coordinate information of the field. The method also includes receiving a freely selected position designated by a user and retrieving information of the freely selected position from the position data, and receiving a fertilization amount value freely set by the user for the freely selected position or for a range including the freely selected position. The information of the freely selected position or the range is retrieved in receiving the freely selected position and retrieving information of the freely selected position. The method further includes generating a calibration curve, based on one or both of the growth data and the soil data, the position data, and the fertilization amount value. The calibration curve has a lateral axis representing the growth data or the soil data and has a vertical axis representing the fertilization amount in a two-dimensional coordinate system.

The present invention also provides a non-transitory computer recording medium storing computer executable instructions for calculating a fertilization amount of a field to be fertilized. The computer executable instructions, when executed by a computer processor, cause the computer processor to receive one or both of growth data that indicates growth potential of the field and soil data that indicates plant growth potential of soil in the field and receive position data as position coordinate information of the field, receive a freely selected position designated by a user and retrieve information of the freely selected position from the position data, and receive a fertilization amount value freely set by the user for the freely selected position or for a range including the freely selected position. The information of the freely selected position or the range is retrieved by the designated position reception and retrieval unit. The computer executable instructions, when executed by a computer processor, also cause the computer processor to generate a calibration curve, based on one or both of the growth data and the soil data, the position data, and the fertilization amount value. The calibration curve has a lateral axis representing the growth data or the soil data and has a vertical axis representing the fertilization amount in a two-dimensional coordinate system.

Effects of the Invention

According to an aspect of the invention, a user of the invention designates a freely selected location (or a range including the freely selected location) and inputs a fertilization amount of fertilizer to be applied to that location (or a range including the freely selected location) on the basis of data indicating the state of a field having position information. This can realize calculation (fertilization design) of a fertilization amount that reflects a fertilization amount based on the intuition of the user of the invention for the entire field in which fertilization is performed.

DESCRIPTION OF EMBODIMENTS

First Embodiment

Overview

Figure 1:
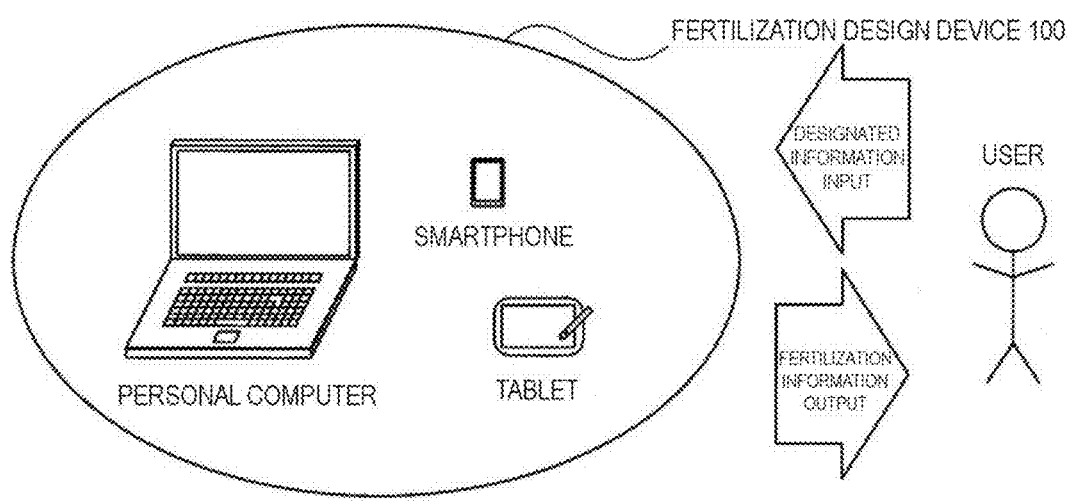
FIG. 1 is a conceptual diagram of an embodiment.

In the present embodiment, on the basis of fertilization amount input for a freely selected location (or a range that includes a freely selected location) designated by a user of the invention, an embodiment is illustrated for performing fertilization design in map-form data in which a level of the growth potential or growth criteria of crops based on freely selected indices has been provided for each location (or a range that includes a freely selected location) of a fertilization target field. In addition, a conceptual diagram thereof is illustrated in FIG. 1.

Configuration of Fertilization Design Device

Figure 2:
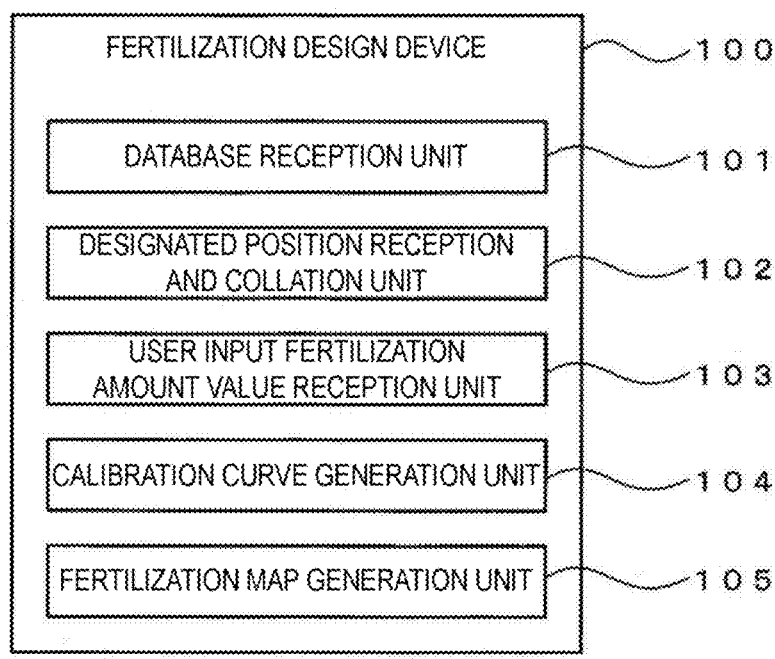
FIG. 2 is a block diagram of a fertilization design device.

The configuration of a fertilization design device 100 is illustrated in FIG. 2. The fertilization design device 100 is a device configured to perform fertilization design and includes a database reception unit 101, a designated position reception and retrieval unit 102, a user set fertilization amount value reception unit 103, a calibration curve generation unit 104, a fertilization map generation unit 105, an average value calculator 116, and a calibration curve correction unit 117. In the present embodiment, the fertilization design device 100 may or may not be portable by a user, and may be a tablet or a smartphone that can be carried, a desktop personal computer or a large-scale supercomputer that cannot be carried, or a computer or computing device mounted on an agricultural tool such as a tractor or a mobile body such as a passenger vehicle. The size and weight of the fertilization design device 100 do not limit the implementation of this embodiment. For example, in an embodiment in which a tractor includes a controller for controlling the assisted driving, automatic driving, or operation of the tractor, the fertilization design device 100 can also be configured by utilizing the functions of the computer provided in this controller.

Each functional unit of the fertilization design device 100 illustrated in FIG. 2 includes an electronic circuit such as a Central Processing Unit (CPU), an Application Specific Integrated Circuit (ASIC), or a Programmable Logic Device (PLD) typified by a Field Programmable Gate Array (FPGA), for example. In addition, a portion of the functions can be configured with dedicated hardware, and other portions can be configured with a general-purpose microcomputer. Alternatively or additionally, application software for executing functions of the functional units illustrated in FIG. 2 may be installed in a general-purpose computer (personal computer) or a control computer of each type (for example, computer for automatic drive control of a tractor), and this computer may be operated as the fertilization design device 100.

Whether to configure each functional unit with dedicated hardware or with software by using a CPU to execute a program is decided in consideration of the required computation speed, cost, power consumption, and the like. Note that configuring the functional units with dedicated hardware and configuring it with software (including configuring the functional units as an application) are equivalent to each other from the standpoint of achieving a specific function. In addition, these are equivalent to implementing each functional unit as a device.

The database reception unit 101 receives map-form data (map data) in which criteria for the growth potential of crops based on freely selected indices are provided for each location (or a range that includes a freely selected location) of a fertilization target field having position information. The data received by the database reception unit 101 includes, for example, a growth map generated from growth data indicating a growth state of plants and the like and position data indicating the growth locations of these plants, or a soil map generated from soil data indicating plant growth potential of the soil and position data indicating the location of this soil. The growth data contains results of evaluations of growth conditions, such as of a stem, a leaf, a flower, and a fruit, performed by a sensor or another unit. A specific example of the growth data includes parameters for evaluating growth conditions, such as the length of a stem, the degree of color of a leaf (amount of a coloring matter), the color of a flower, and the size of a fruit. Note that the growth data may be acquired using a plant sensor or the like, and may be acquired using the technique described in JP 2012-247235 or the like, for example. The position data can be acquired by using a Global Navigation Satellite System (GNSS) position specification device or the like. The soil data can be acquired by detecting reflection light with a specific wavelength (for example, detecting a wavelength specific to nitrogen) using a laser sensor or by analyzing the soil with a spectral camera or analyzing past growth histories and the like.

Figure 3:
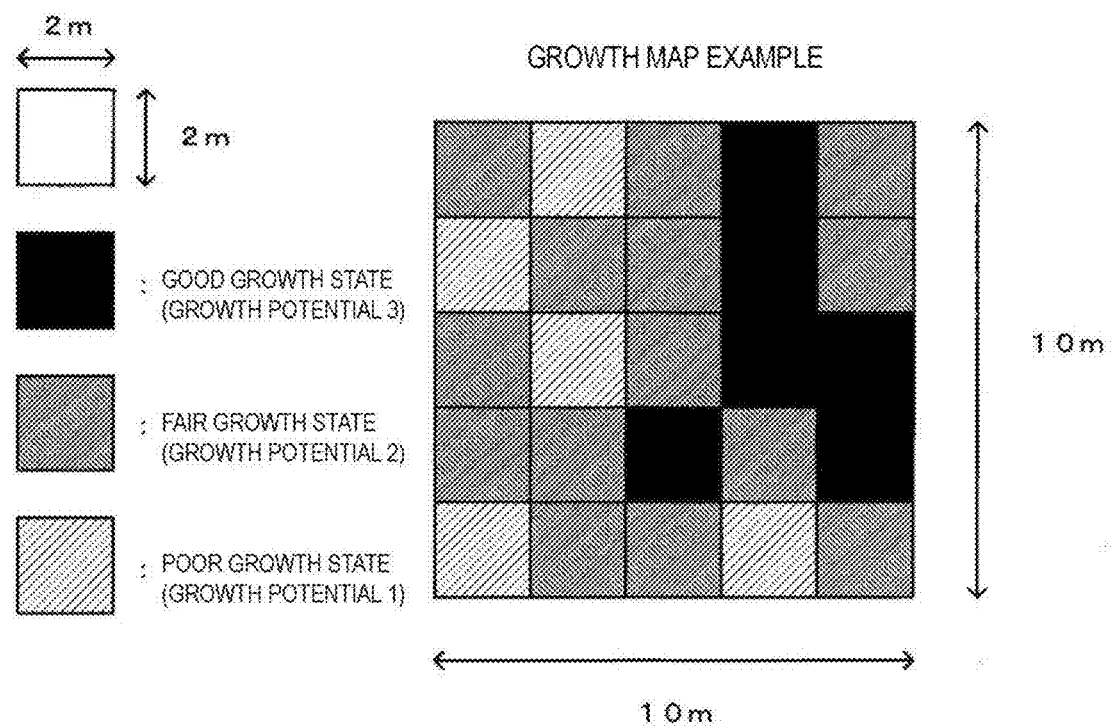
FIG. 3 is a conceptual diagram of a growth map.

Here, the growth map is a map based on data resulting from the current state of the plant and representing the growth state of the plants at each location having position information (position data), and the map represents the differences in growth potential arising from differences in the soil condition, sunlight, and the like. The growth map can be generated by expressing the growth conditions at freely selected stages (2 or more) for freely selected ranges of a fertilization target field or the like. For example, in a case where a square field with a side of 10 m is divided into ranges with sides of 2 m, 25 squares with sides of 2 m are formed. The growth map can be generated by evaluating the growth conditions or growth potential with respect to 25 squares by using 2 or more numbers; for example, by evaluating the growth conditions with three levels of good, fair, and poor (or growth potential 3, 2, 1). The growth map in this case is illustrated in FIG. 3.

Examples of the growth indices that serve as the basis of the growth map include the length of the stem of the growing crops, a leaf size, a color, a sugar content, a starch concentration, the concentration and content of specific elements and components, electrical conductivity, specific light reflectivity, the density of leaves obtained from image analysis, light transmittance, or a combination of a plurality of these indices. Note that, since the map data of the expected yield amount, obtained when captured images of growing crops are analyzed and the yield amount is predicted, is a parameter related to the growth state of the current state of presently existing crops, this information becomes part of the growth map.

The soil map is a map based on data resulting from past or present soil and representing the potential for growing plants or the like of the soil (growth potential) or the nature of the soil at each location having position information (position data), and the map represents the conditions of the soil at freely selected stages (2 or more) for freely selected ranges of the fertilization target field or the like. Accordingly, by replacing the growth conditions or growth potential of the plants in the above-mentioned growth map with the growth potential of the soil map, the soil map can be generated in the same way as the growth map described above.

The soil map can be generated by mapping, as indices, the sufficiency rate (or content) of the soil fertilizer components (nitrogen, phosphoric acid, potassium, or the like), the chemical properties of the soil such as PH (hydrogen ion concentration) and EC (electrical conductivity), the physical properties of the soil such as water retention capacity and breathability, and the biological properties of the soil such as the decomposition force of organic matter and the abundance of disease-resistance insect pests, for example. In this case, the average value of the density ($mg/m^3$) of nitrogen, phosphoric acid, and potassium in soil that can be regarded as fertile is taken to have a sufficiency rate of 100%. A sufficiency rate of less than 35% is denoted as soil level 1 (growth potential 1), a sufficiency rate from 35% to less than 65% is denoted as soil level 2 (growth potential 2), a sufficiency rate from 65% to 100% is denoted as soil level 3 (growth potential 3), and these are mapped in units of 2 m×2 m sections. This map becomes the soil map.

In addition, since yield amount maps, in which numerical values of past yield amounts are given for freely selected ranges in the fertilization target field, and quality maps, in which the quality of crops or components included in the crops harvested in the fertilization target field is evaluated or added with values for freely selected ranges, also indicate the growth potential of each location (or each range) in the field, these are equivalent to the soil map received by the database reception unit 101, and are included in one of the soil maps. The yield amount map and the quality map can be generated by evaluating freely selected ranges of the fertilization target field or the like for yield and quality at freely selected stages (2 or more), and, for example, in the case of a three-stage evaluation, can be generated in the same way as in the example of generating the growth map mentioned above.

The designated position reception and retrieval unit 102 is configured to receive a freely selected location (a target location to which the user sets the fertilization amount, or a range including that position) designated by the user and to retrieve information thereof from the growth map or the soil map received by the database reception unit 101.

The location for setting the fertilization amount may be designated by the user such that a growth map or a soil map is displayed on the screen of an information display unit (not illustrated) provided in the fertilization design device 100 or a separate external information display apparatus, and the user touches the displayed map with a pen or a finger or clicks it with a mouse. Alternatively, since the position information is provided to the growth map or the soil map, the user may input the location with a map coordinate system. Note that the map coordinate system is a global coordinate system used when handling map data. Normally, the position data obtained by the GNSS position specification device (for example, a general-purpose GPS receiver) described above is position data in the map coordinate system. The above-described method of specifying the position is an example, and provided that the location can be specified on the growth map and the soil map, the method is not limited to the method described above.

The user input fertilization amount value reception unit 103 receives a freely selected fertilization amount set by the user with respect to a freely selected position (or a range including that position) designated by the user. The received fertilization amount may be an amount based on the intuition of the user or may be an amount resulting from an analysis of big data or the like, and there is no need for a technical basis for the received amount. In addition, the fertilization amount received here may be a specific numerical value, or may be a numerical value having a range (for example, a fertilizer with an allowable fertilization amount within a range from $N_1$ kg to $N_2$ kg per unit area is applied).

Figure 4:
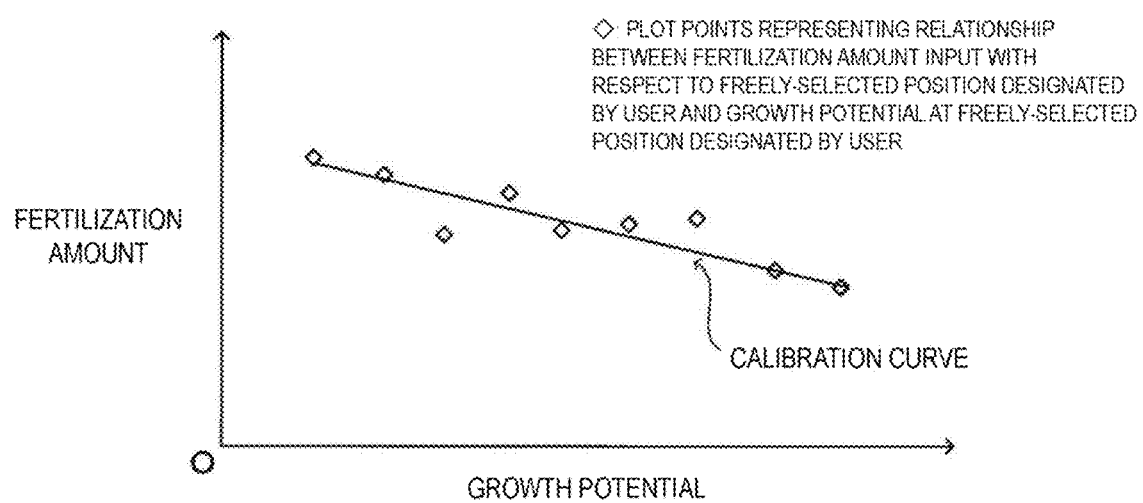
FIG. 4 is a conceptual diagram of a calibration curve illustrated on an X-Y graph.

The calibration curve generation unit 104 is configured to generate an X-Y graph in which the growth conditions in the growth map or the growth potential of the soil conditions in the soil map are a parameter in the X-axis direction and the fertilization amount is a parameter in the Y-axis direction, and generate a calibration curve in accordance with the growth conditions or the soil conditions by referring to the fertilization amount set for the freely selected positions (or a range including those positions) designated by the user on the above-mentioned X-Y graph. Note that a case where a calibration curve is drawn on the X-Y graph is illustrated in FIG. 4.

Here, the growth conditions in the growth map or the soil conditions in the soil map that are represented as the parameter in the X-axis direction of the X-Y graph are not limited to the growth conditions or the soil conditions of a freely selected stage (2 or more) set in the growth map or the soil map received by the base map reception unit 101, and provided that detailed values (for example, numerical measured values) of the growth conditions or soil conditions are given, other data can also be used.

As an example of generating a specific calibration curve, first, a position (or a range including that position) where the user wants to determine the fertilization amount is specified on the growth map or the soil map, the growth conditions or soil conditions of the position on the map are acquired, and plot points are placed at the positions on the X-Y graph that correspond to the acquired growth conditions or soil conditions and the fertilization amount set by the user. By performing this at least twice, a calibration curve that connects the plotted points can be generated.

For example, the calibration curve may be shown in a graph in a two-dimensional coordinate system with a lateral axis that represents soil data (for example, a nitrogen content representing a degree of nutriment) and with a vertical axis that represents a fertilization amount (application amount of fertilizer per unit area). The soil data is obtained by an optical sensor or another unit. The user has experimental knowledge of the fertilization amount in each section of the field. In response to designation of a specific position in an aerial photograph of the field by the user, soil data (value of the lateral axis) of the designated specific position is obtained.

When the user then inputs a fertilization amount (value of the vertical axis) of the designated specific position, one point in the two-dimensional coordinate system is determined. This is used as a plot point. This working step is performed for another position that has a soil condition different from that of the position of the plot point, whereby a second plot point is determined. These plot points for different positions in the two-dimensional coordinate system may be connected by a line (in a simple example, straight line) to obtain a calibration curve.

In a case that the working step for determining a plot point is performed three or more times, the calibration curve may be generated as an approximate straight line. In the case of using three or more plot points, a function that fits thereto may be calculated, and a line represented by this function may be used as a calibration curve.

In a case that a plot point exists at an irregular position that does not align with other plot points, the user may be prompted to re-designate the position and reset the fertilization amount. In a case that the user re-designates the position and resets the fertilization amount, the user may re-designate only the places that greatly deviate from the generating calibration curve and reset the fertilization amount, or may re-designate all the points and reset the fertilization amount.

Similarly, in a case that the fertilization amount specified by the user is in a numerical range format, the calibration curve is generated so as to pass through the numerical range designated by the user. However, in a case that the calibration curve cannot path through the entire numerical range designated by the user, the user may be prompted to re-designate the position and reset the fertilization amount, or an approximate straight line may be generated. Note that the method of generating the calibration curve described above is an example, and the method of generating the calibration curve is not limited to the above-described method.

The lateral axis of the calibration curve may represent growth data. In this case, for example, the lateral axis may represent a concentration of color of a leaf of a crop (such as a concentration of a coloring matter for green), and the vertical axis may represent a fertilization amount, for a calibration curve generated. The growth data other than the color of a leaf may include numerical parameters such as of the length of a stem, the color of a flower, and the size of a fruit.

The fertilization map generation unit 105 is configured to generate a fertilization map from the growth map or the soil map received by the database reception unit 101 and the calibration curve generated by the calibration curve generation unit 104. Here, the fertilization map is a map that represents the fertilization amount at each location having position information (position data) and in which freely selected fertilization amounts are set for freely selected ranges of a fertilization target field or the like. That is, the fertilization map can be generated by replacing the plant growth conditions or growth potential set at each location in the growth map and the soil map with the fertilization amount using the calibration curve described above.

That is, on the basis of the calibration curve (the relationship between the growth conditions or the soil conditions and the fertilization amount) generated by the calibration curve generation unit 104, the fertilization map can be created by representing the fertilization amount on the growth map and the soil map received by the database reception unit 101.

Figure 5:
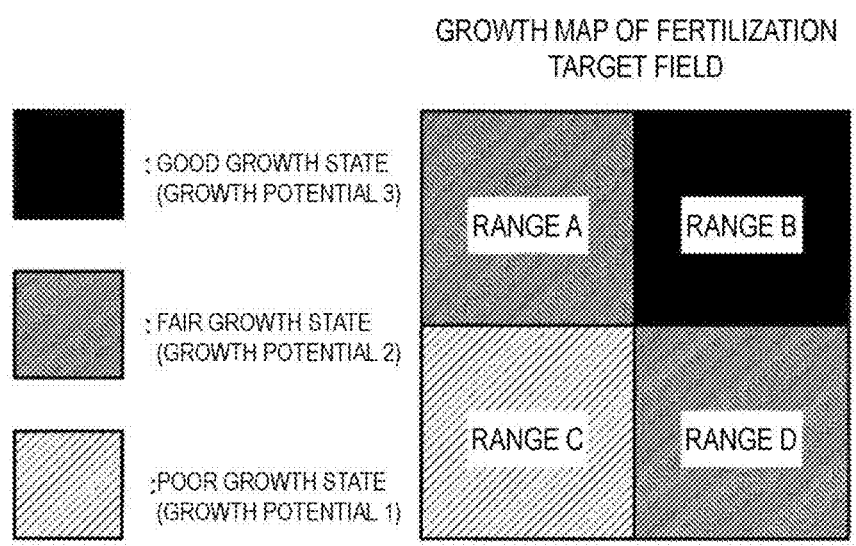
FIG. 5 is a conceptual diagram of a growth map.
Figure 6:
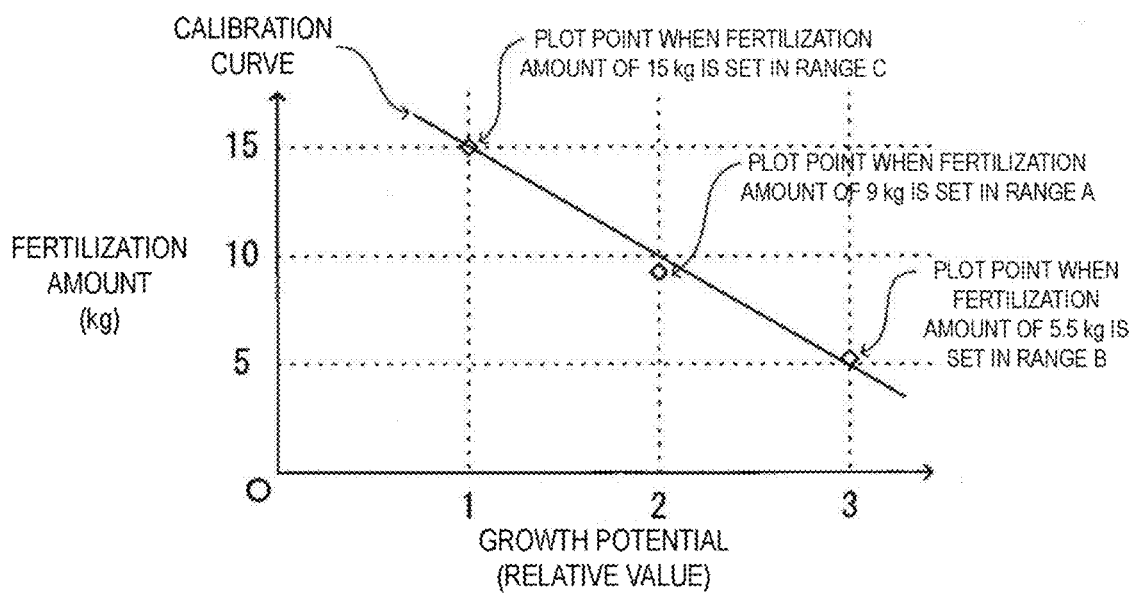
FIG. 6 is a conceptual diagram of a calibration curve illustrated on an X-Y graph.

A specific example of generating the fertilization map is described below. For example, consider a case in which a fertilization map is generated for a fertilization target field of a freely selected size. As illustrated in FIG. 5, suppose that a growth map is provided in which the fertilization target field is divided into four ranges of A, B, C, and D, and the growth potential of each of A, B, C, and D is set to 2, 3, 1, and 2, respectively. In a case that a user sequentially selects A, B, and C of the fertilization target field and sets the fertilization amounts to 9 kg, 5.5 kg, and 15 kg, respectively, assuming that the X-axis parameter is the growth potential and the Y-axis parameter is the fertilization amount set by the user, three plot points are placed at the intersection of the growth potential 2 corresponding to the fertilization amount setting of A and the fertilization amount of 9 kg, the intersection of the growth potential 3 corresponding to the fertilization amount setting of B and the fertilization amount of 5.5 kg, and the intersection of the growth potential 1 corresponding to the fertilization amount setting of C and the fertilization amount of 15 kg, and a calibration curve is generated by connecting or approximating the plot points of these three points. Note that an example of the generated calibration curve is illustrated in FIG. 6.

Figure 7:
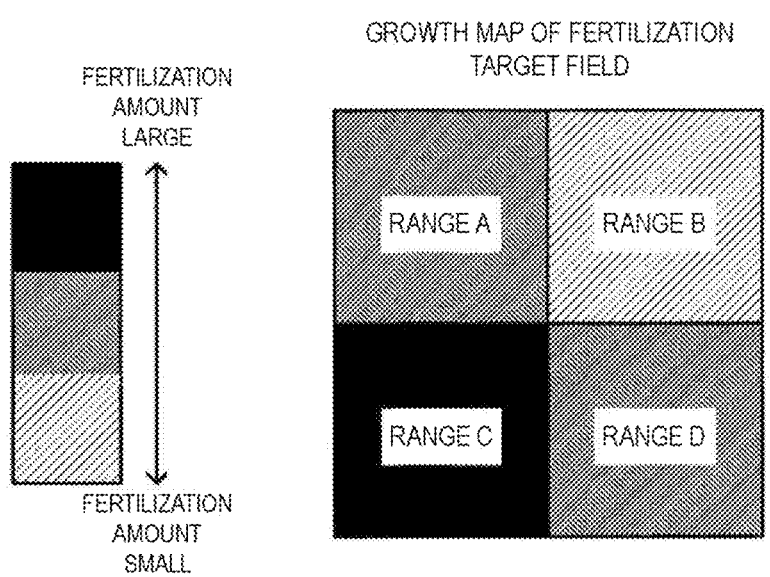
FIG. 7 is a conceptual diagram of a fertilization map.

The fertilization map is generated by reading the fertilization amount corresponding to the growth potential set in the initially provided growth map from the calibration curve and replacing the growth potential of the growth map with the fertilization amount. In a case of the growth map of FIG. 5, for example, a fertilization map is generated in which A is set to a fertilization amount of 10 kg, B is set to a fertilization amount of 5 kg, C is set to a fertilization amount of 15 kg, and D is set to a fertilization amount of 10 kg. An example of the fertilization map generated in this case is illustrated in FIG. 7.

The average value calculator 116 and the calibration curve correction unit 117 are not used in this example. The functions thereof will be described later.

Note that the fertilization design device 100 may have a configuration provided with a storage unit for storing received data, past records or the like, or the data may be stored in an external storage device separate from the fertilization design device 100 such that the data can be used at an appropriate time. Data can be transmitted and/or received to/from the external storage device as long as the fertilization design device 100 includes a communication unit. Further, as long as the fertilization design device 100 includes a communication unit, implementation of the invention in combination with other devices can be facilitated.

Processing Example

Figure 8:
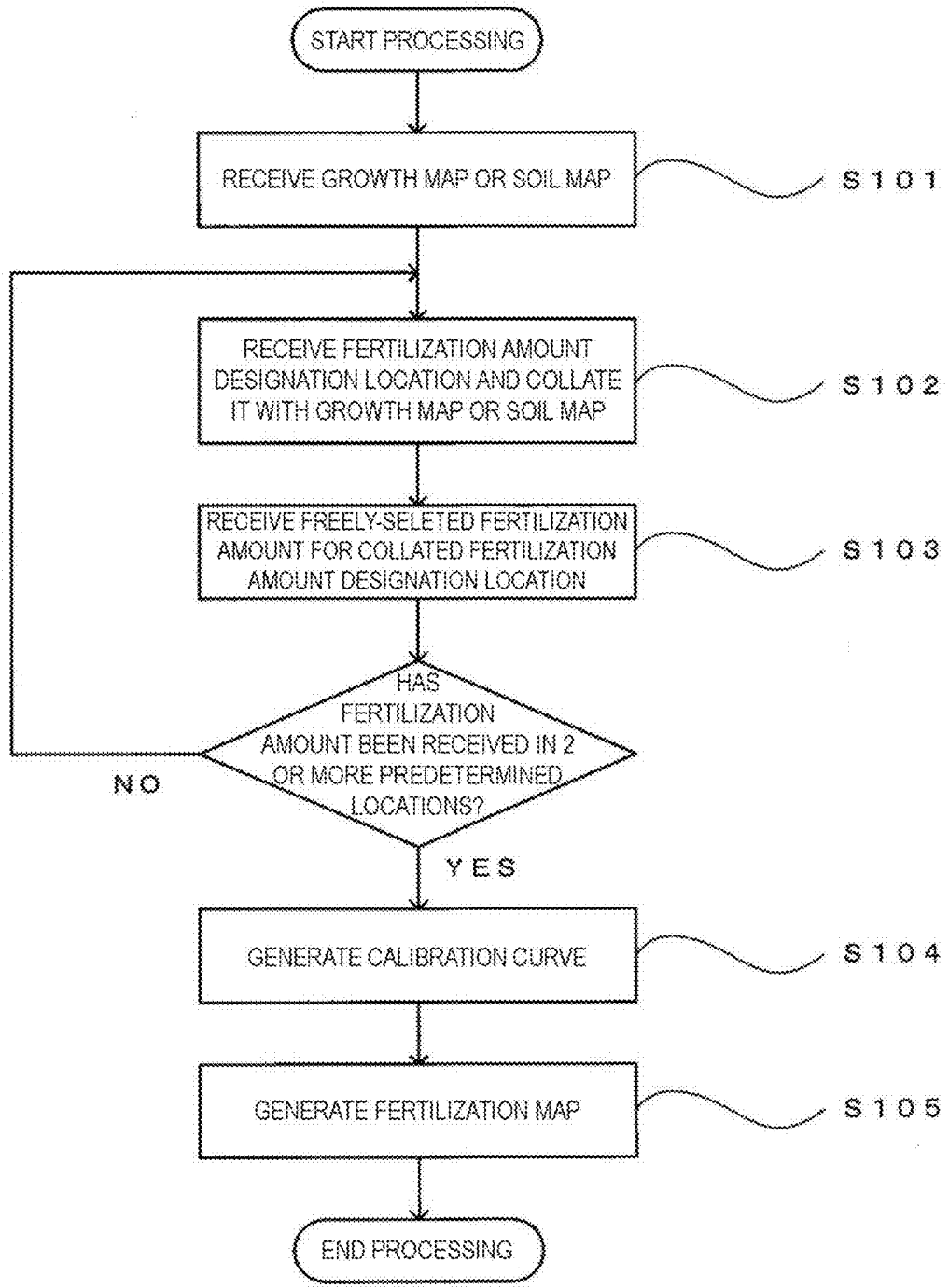
FIG. 8 is a flowchart illustrating an example of processing.

An example of processing in the present embodiment is illustrated in FIG. 8. A program for executing the processing in FIG. 8 is stored in an appropriate storage medium and is executed by the fertilization design device 100 in FIG. 1. This program may be stored in a server and may be downloaded therefrom to use.

First, the fertilization design device 100 receives a growth map or a soil map of a fertilization target field (Step S101). Next, a place (a position or a range including the position) where the user wants to set the fertilization amount is received and retrieved from the growth map or the soil map received at Step S101 (Step S102).

Next, a freely selected fertilization amount designated by the user is received for the place (a position or a range including the position) on the growth map or the soil map corresponding to the place (a position or a range including the position) for which the user wants to set the fertilization amount designated in Step S102 (Step S103). Step S102 and Step S103 are repeated a freely selected number of times greater than or equal to 2.

An X-Y graph in which the growth conditions in the growth map or the soil conditions in the soil map are set as the parameter in the X-axis direction and the fertilization amount is set as the parameter in the Y-axis direction is generated, and a calibration curve in accordance with the growth conditions or the soil conditions is generated by plotting the fertilization amount input for the position or the range designated by the user on the above-mentioned X-Y graph (Step S104).

Finally, the fertilization map is generated from the growth map or the soil map received in Step S101 and the calibration curve generated in Step S104 (Step S105). Here, the processing completes.

By using the fertilization map obtained by the above processing (from Step S101 to Step S105) together with an agricultural tool (agricultural tractors, tilling machines, cropping machines for crop seeds or bulbs, and agricultural machinery that tows fertilizer devices while moving, for example) equipped with a fertilizer device, fertilization that reflects the intuition of the user can be achieved swiftly and on a large scale. For example, an operator of the agricultural tool equipped with the fertilizer device may perform fertilization while looking at the fertilization map and manually adjusting the fertilization amount. In addition, in a case that the agricultural tool equipped with the fertilizer device includes a control device capable of reading the fertilization map, the control of the fertilization amount can be automated. Further, in a case that the agricultural tool equipped with the fertilizer device includes an automatic steering system and a GNSS position specification device, fertilization in which driving operation is also automated can be achieved.

In addition, the calibration curve generated in Step S104 can be used not only for generating the fertilization map in Step S105, but also for such applications as prediction and analysis of the consumption amount of the fertilization amount, and the like.

Modifications

In the above embodiment, it is described that the database reception unit 101 receives a growth map or a soil map. The data (information) received by the database reception unit 101, however, is not limited to map-form data (map data) that has position data and the like. For example, numeric-form data (numerical data) may also be used.

The numerical data may be in a database format that includes, for example, position coordinates in the map coordinate system of each location of the field, and parameters indicating the growth potential of each location.

Figure 9:
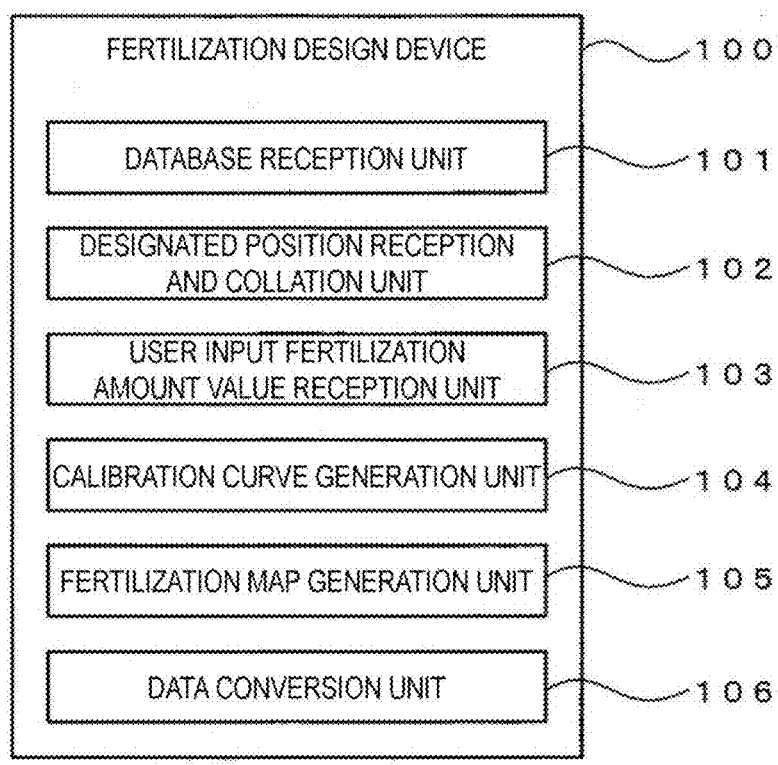
FIG. 9 is a block diagram of a fertilization design device.

FIG. 9 illustrates the configuration of the fertilization design device 100 in this case. As illustrated in FIG. 9, the fertilization design device 100 may include a data conversion unit 106. The data conversion unit 106 is configured to convert numerical-form data having position coordinates in the map coordinate system for each location in the field and parameters indicating the growth potential of each location into map data.

The fertilization map can be created by converting the received numerical data into map data in the data conversion unit 106, and subsequently performing the above-described processing from Step S102 to Step S105.

Second Embodiment

Overview

Figure 10:
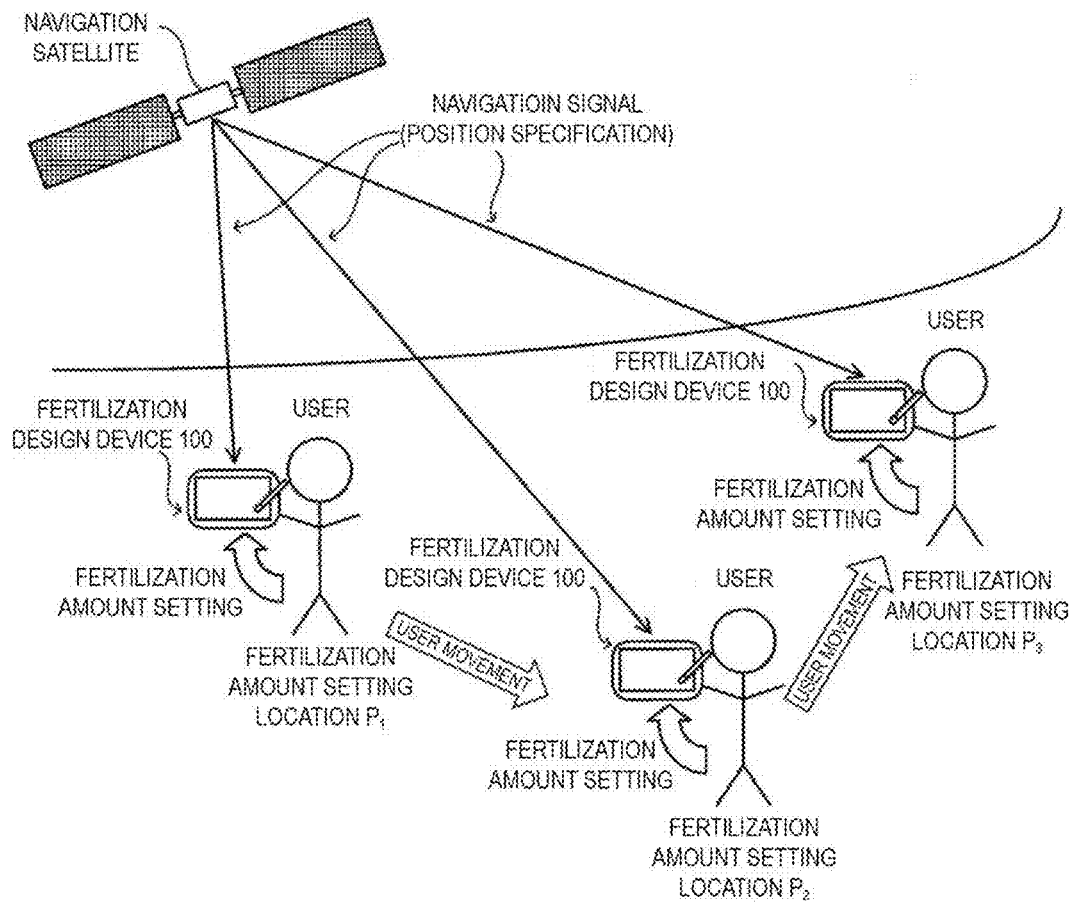
FIG. 10 is a conceptual diagram of an embodiment.

Here, an embodiment is illustrated in which a fertilization design of a target field is achieved by a user carrying the fertilization design device 100 and setting the fertilization amount for the position where the user himself/herself is present. In addition, a conceptual diagram thereof is illustrated in FIG. 10.

Configuration of Fertilization Design Device

Figure 11:
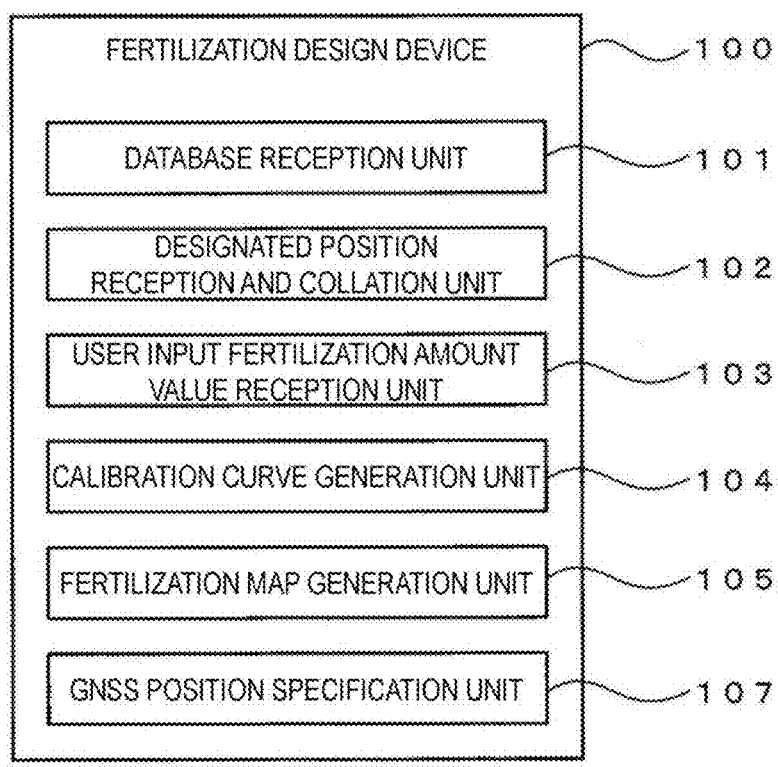
FIG. 11 is a block diagram of a fertilization design device.

The configuration of the fertilization design device 100 is illustrated in FIG. 11. As illustrated in FIG. 11, the configuration is such that a GNSS position specification unit 107 is added to the configuration of the first embodiment. The GNSS position specification unit 107 receives a navigation signal from a navigation satellite typified by a GPS satellite and performs positioning (position specification) on the basis of the signal. The position (longitude, latitude, altitude) of the GNSS position specification unit 107 (the position of the antenna of the GNSS position specification unit 107) in the map coordinate system is specified by the GNSS position specification unit 107. Then, in the case of the present embodiment, the designated position reception and retrieval unit 102 receives the position data from the GNSS position specification unit 107.

Processing Example

Figure 12:
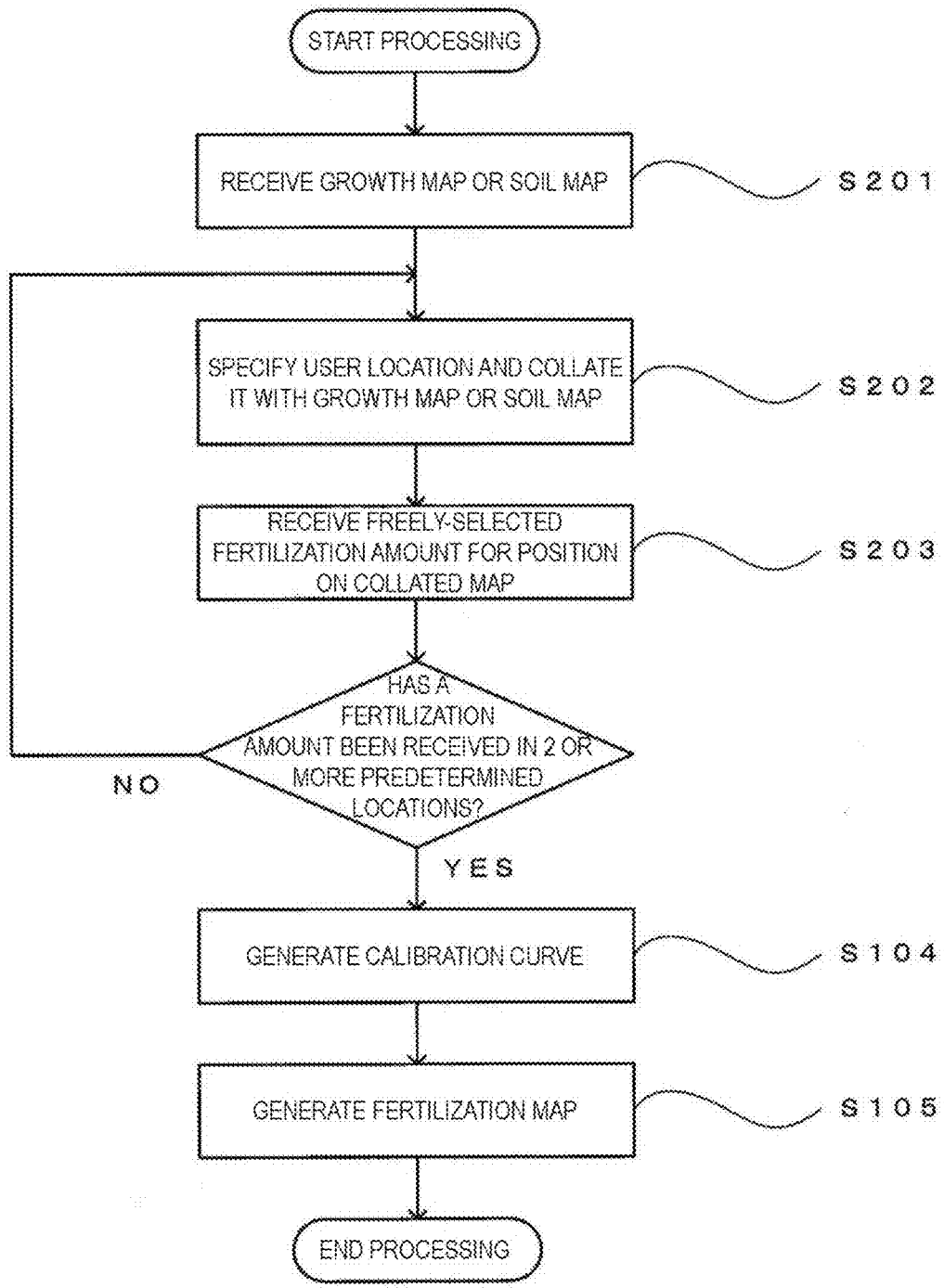
FIG. 12 is a flowchart illustrating an example of processing.

An example of processing in this embodiment is illustrated in FIG. 12. A program for executing the processing in FIG. 12 is stored in an appropriate storage medium and is executed by the fertilization design device 100 in FIG. 11. First, the fertilization design device 100 receives a growth map or a soil map of a fertilization target field (Step S201). Next, when the user carrying the fertilization design device 100 arrives at the position (fertilization amount setting location P), in the field, that serves as the fertilization target to which the user wants to set the fertilization amount, the GNSS position specification unit 107 specifies the position (or a range including the position) of the place where the user wants to set the fertilization amount and retrieve information thereof from the growth map or the soil map received in Step S101 (Step S202).

Next, a freely selected fertilization amount designated by the user is received for the position on the growth map or the soil map corresponding to the position (or a range including the position) specified in Step S202 for which the user wants to set the designated fertilization amount (Step S203). Step S202 and Step S203 are repeated a freely selected number of times greater than or equal to 2. For example, as illustrated in FIG. 10, in a case where the fertilization amount is to be set at three points while the user moves, the position is specified by the navigation satellite for each location of the fertilization amount setting locations $P_1$, $P_2$, and $P_3$, and the fertilization amount is set by the user. Subsequently, the same processing as that in the above-described Step S104 and Step S105 is carried out sequentially. This provides the fertilization map, and the processing completes.

Figure 13:
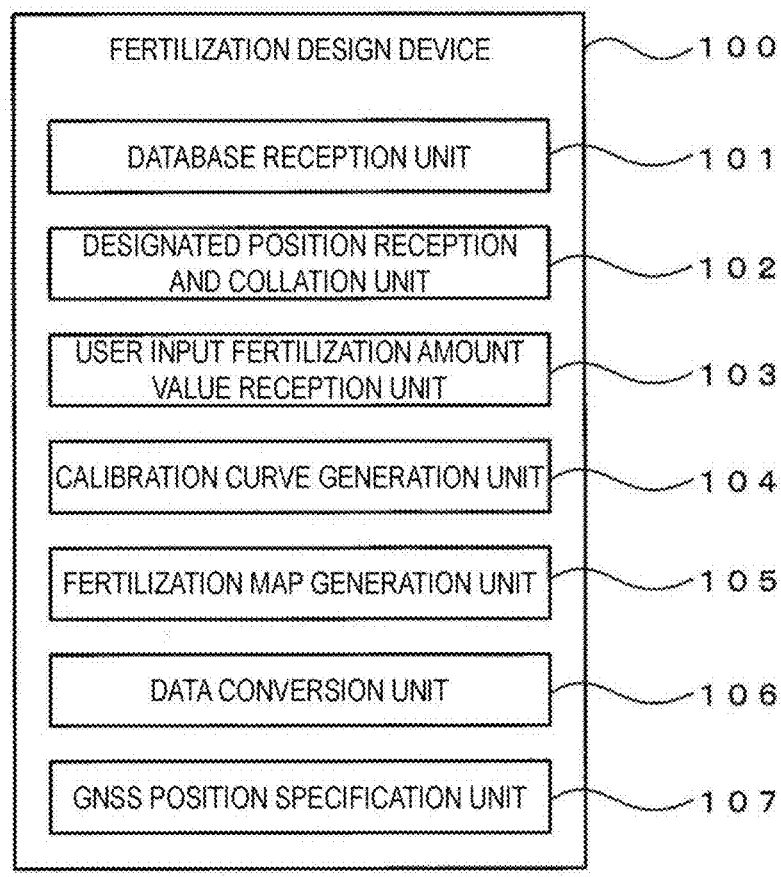
FIG. 13 is a block diagram of a fertilization design device.

Note that, in a case that numerical data is received instead of map data in Step S201, this data can be made into map data by the data conversion unit 106, and processed in the same manner as in the modification of the first embodiment. FIG. 13 illustrates the configuration of the fertilization design device 100 in this case.

In the present embodiment, although it is preferable for the user to carry and operate the fertilization design device 100, the embodiment is not necessarily limited to a case where the user can carry the fertilization design device 100. For example, the fertilization design device 100 is loaded on a mobile body, the user moves to the positions in the field where the user wants to set the fertilization amount, and the above-described steps S202 and S203 are carried out. This allows the user to use a fertilization design device 100 having a size and weight that cannot be carried by the user.

Third Embodiment

Overview

Regarding the calibration curve generated by the calibration curve generation unit 104, a generation method is conceivable in which a calibration curve to serve as a sample is generated from the accumulated data, the map data received by the database reception unit 101, the numerical data to be described later, and the like, and a user customizes or edits this calibration curve. The processing in this case is illustrated in the present embodiment.

Configuration of Fertilization Design Device

Figure 14:
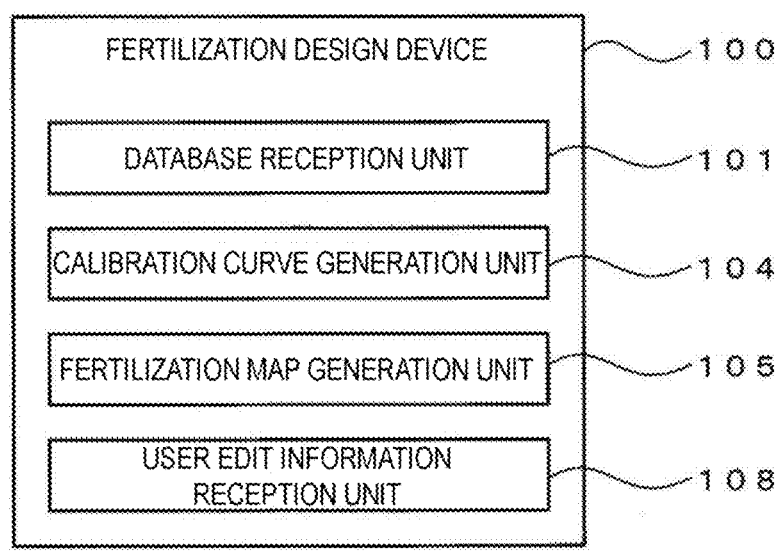
FIG. 14 is a block diagram of a fertilization design device.

The configuration of the fertilization design device 100 is illustrated in FIG. 14. The fertilization design device 100 according to the present embodiment includes the database reception unit 101, the calibration curve generation unit 104, the fertilization map generation unit 105, and a user edit information reception unit 108.

The database reception unit 101 has the same function as in the cases of the first and second embodiments. The calibration curve generation unit 104 is configured to generate a calibration curve to serve as a sample from the accumulated data, the map data received by the database reception unit 101, the numerical data to be described later, and the like.

The user edit information reception unit 108 is configured to receive edited contents (for example, an adjustment of the slope of the calibration curve, a translation along the Y axis of the calibration curve that serves as the sample, and the like) freely performed by the user and to apply the received edited contents to the calibration curve generated by the calibration curve generation unit 104. The fertilization map generation unit 105 generates a fertilization map on the basis of map data such as the growth map and the soil map received by the database reception unit 101 and the calibration curve reflecting the edited contents being received by the user edit information reception unit 108.

Processing Example

Figure 15:
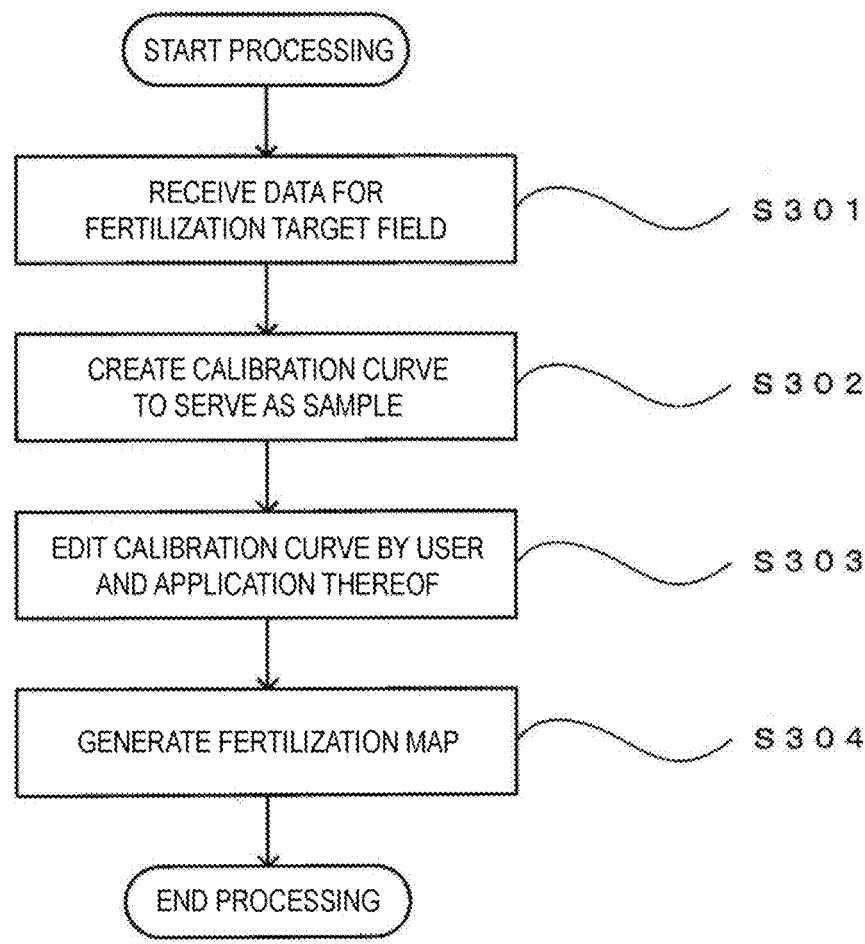
FIG. 15 is a flowchart illustrating an example of processing.

An example of processing in the present embodiment is illustrated in FIG. 15. A program for executing the processing in FIG. 15 is stored in an appropriate storage medium and is executed by the fertilization design device 100 in FIG. 14. First, map data or numerical data for the fertilization target field is received by the database reception unit 101 (Step S301). Next, a calibration curve to serve as a sample is generated in the calibration curve generation unit 104 (Step S302). A final calibration curve is generated by means of a user editing the calibration curve serving as the sample generated in Step S302 (Step S303). A fertilization map is generated from the final calibration curve generated in Step S302 (Step S304), and the processing completes.

Note that in the case of the present embodiment as well, in a case that numerical data is received instead of map data in Step S301, since the fertilization design device 100 includes the data conversion unit 106 described above, this data can be converted into map data, and the subsequent processing can be performed.

In a case that the fertilization design device 100 in the first and second embodiments includes the user edit information reception unit 108, a user can edit the calibration curve as in the present embodiment. For example, the processing method is such that after a user edits the calibration curve generated in Step S104, a fertilization map is generated in Step S105.

Fourth Embodiment

A user (user using the present invention in farm working in the field) has experimental knowledge of an average fertilization amount (kg/m$^2$ or kg/10 a) in the field. Thus, it is convenient for the user to be able to generate a calibration curve as illustrated in FIG. 6 by using this average fertilization amount. This embodiment describes an example of a case of generating a calibration curve by using an average fertilization amount in a target field, which is known by the user. The hardware illustrated in FIGS. 1 and 2 is used in this embodiment.

Figure 16:
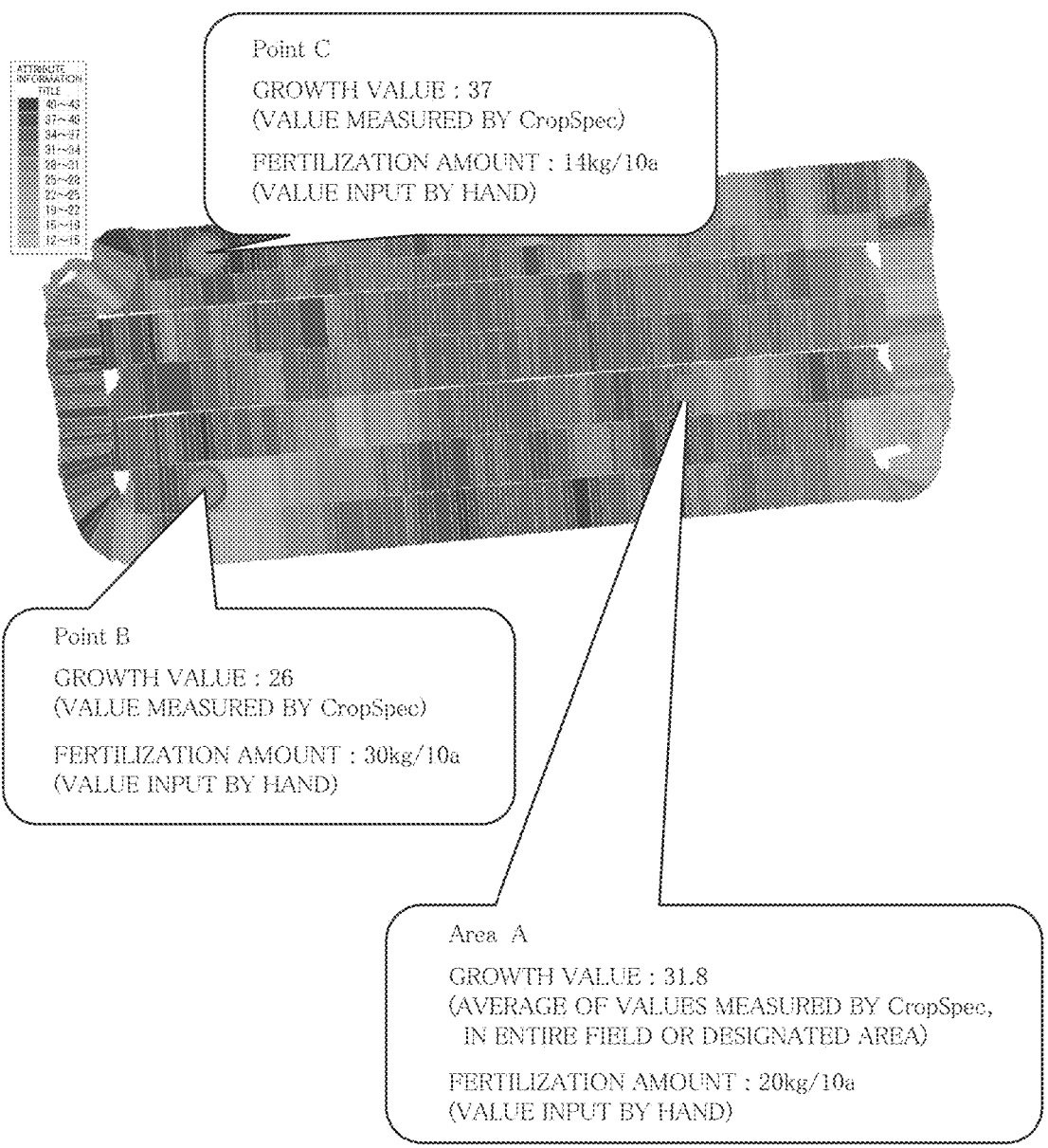
FIG. 16 is a diagram illustrating an example of a displayed content of an input screen.

FIG. 16 illustrates an example of an operation screen displayed on a display of a PC constituting the fertilization design device 100. FIG. 16 illustrates a map image. This map image is an example of the soil map. The map image in FIG. 16 shows growth value distribution data of a field for which a calibration curve is generated. This data is shown by a processed image that is generated by embedding growth value data in an aerial photograph of the field to enable visually understanding the growth values of sections in the field by concentration of color. The growth value is an example of the soil data and is an index representing the growth potential of soil (potential of soil for growing a crop). In this example, it is assumed that the growth value relates to a content of nitrogen in a leaf grown on nitrogen-based nutrients in the soil. For example, the content of nitrogen in a leaf can be measured by a nitrogen sensor using laser light.

When the user clicks (designates) an appropriate part outside the control screen as illustrated in FIG. 16, an average of the growth values in the field is displayed outside the map, and a window for inputting an average fertilization amount is also displayed. The average of the growth values is obtained as follows: a field is sectioned in a matrix shape, growth values of all of respective sections are summed up, and the sum of the growth values is divided by the total number of the sections. This process is performed by the average value calculator 116 in FIG. 2.

The user inputs an average fertilization amount of the target field in the window. In this example, the user inputs a value that is based on own experience, as the average fertilization amount. At this time, the user can refer to the value of the average growth value of the target field that is displayed on the display.

Next, the user freely selects a point on the map as illustrated in FIG. 16 and clicks (designates) the point. The selected point should have a growth value that is different to some degree from the average value. In response to this input, data of the growth value at this position designated by the user is retrieved and is displayed on the display. In looking at this growth value, the user determines an amount of fertilizer (fertilization amount) to be applied to the designated position. This determination is performed by the user on the basis of past experience and knowledge of the user. The determination may be performed by also considering factors such as a crop to be cultivated, the season, an expected shipping amount of the crop, and cost.

Thereafter, the input average fertilization amount is set on a vertical axis, and a growth value corresponding thereto is set on a lateral axis, whereby a first point is obtained. On the other hand, a fertilization amount at the position that is designated by the user on the map is input by the user, and this fertilization amount and a growth value at this position are plotted to obtain a second point, whereby a calibration curve graph is generated.

Figure 17:
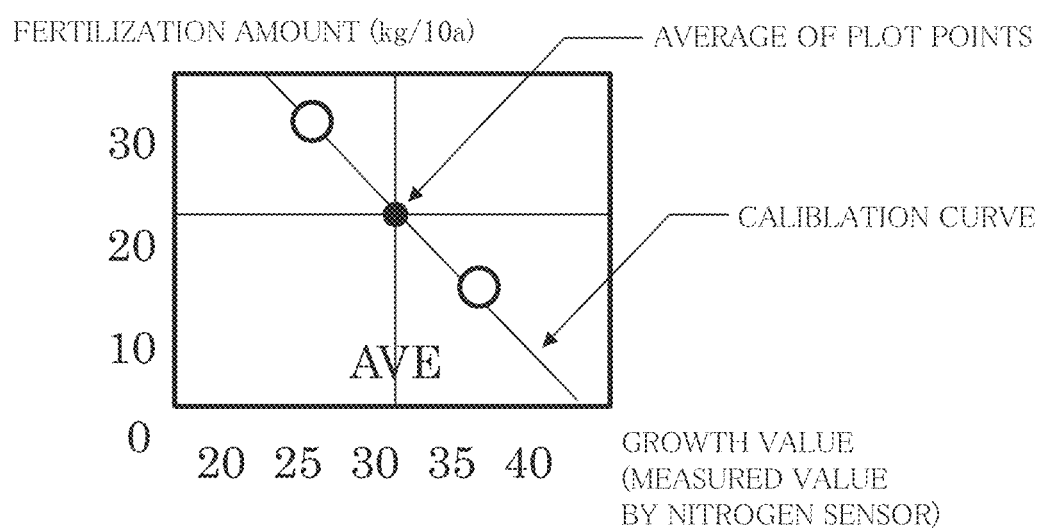
FIG. 17 illustrates an example of the calibration curve.

That is, the growth value is set on the lateral axis, whereas the fertilization amount is set on the vertical axis, and the first and the second points are plotted. A straight line that passes both of these points is drawn, and a calibration curve as exemplified in FIG. 17 is generated. In this case, the second point may be one or plural. For example, a position having a growth value greater than the average value is used as the second point, and a position having a growth value less than the average value is used as a third point. The fertilization amounts of these points are input to generate a calibration curve based on the three points.

The first point and the second point that are close to each other can cause an increase in error in the calibration curve. In view of this, a position with a lighter color (or a deeper color) in the map as illustrated in FIG. 16 is preferably selected as the second point.

The designation of the second point may be assisted by highlighting a position with an average of the growth values or with a value close to the average of the growth values. This provides easy designation of a point with a growth value separated from the average value as the second point.

Modification Example

Figure 18:
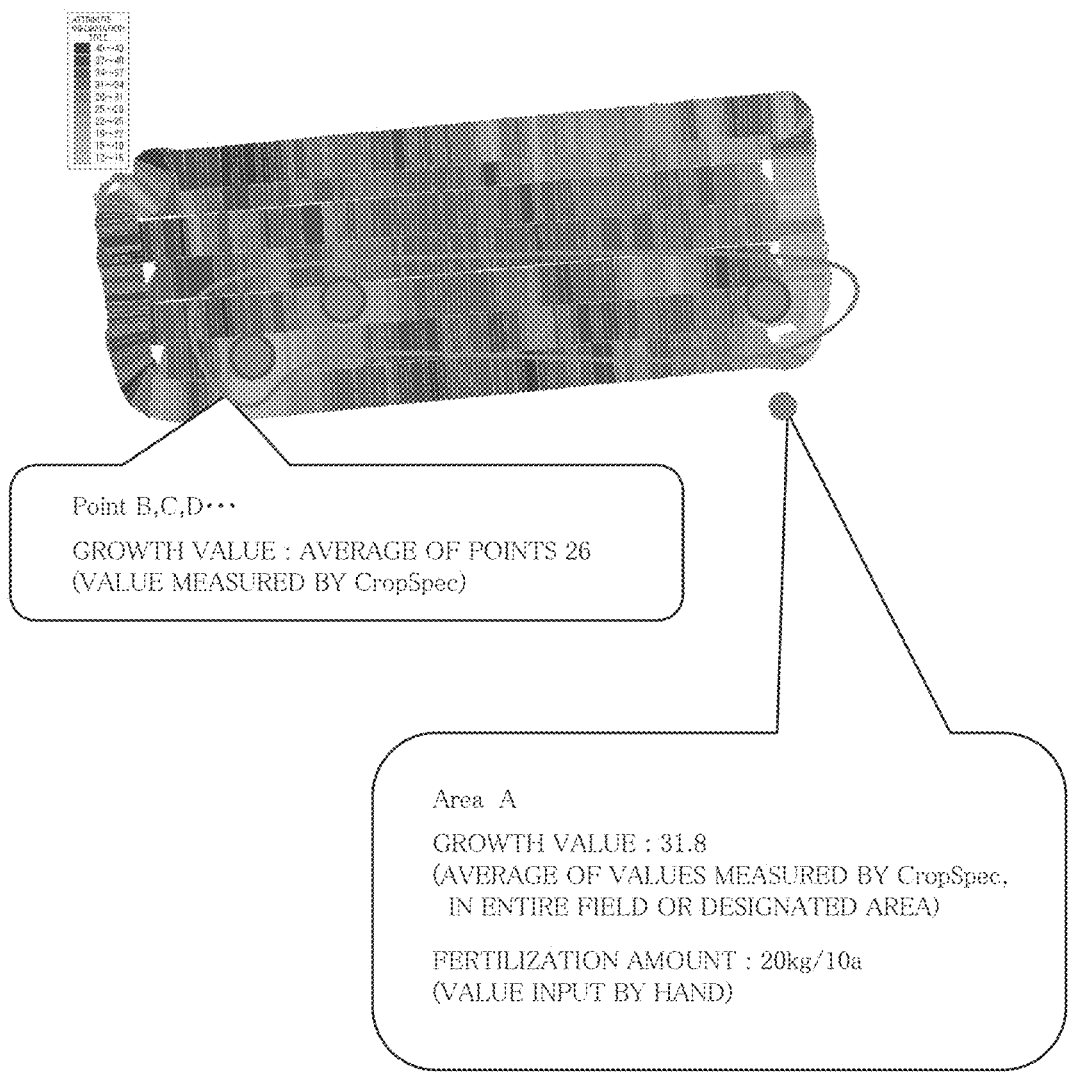
FIG. 18 is a diagram illustrating an example of the displayed content of the input screen.

To designate the second point, multiple points may be selected, an average of the growth values of the selected points may calculated, and a plotting position for the second point may be determined by referring to this average value. An example of this case is illustrated in FIG. 18. As in the case illustrated in FIG. 16, an average fertilization amount of the whole field is input also in the case illustrated in FIG. 18. The method for obtaining the first point for the calibration curve is the same as that in the case illustrated in FIG. 17.

In this case, three points of points B, C, D are selected by a user (two points or four or more points can be selected). The positions of the points are freely selected. The user then inputs a fertilization amount for each of the three points on the basis of own judgment. The growth values of the three points are then retrieved, and an average thereof is calculated. In addition, an average of the fertilization amounts of the three points input by the user is calculated. This process is performed by the average value calculator 116 in FIG. 2.

Figure 19:
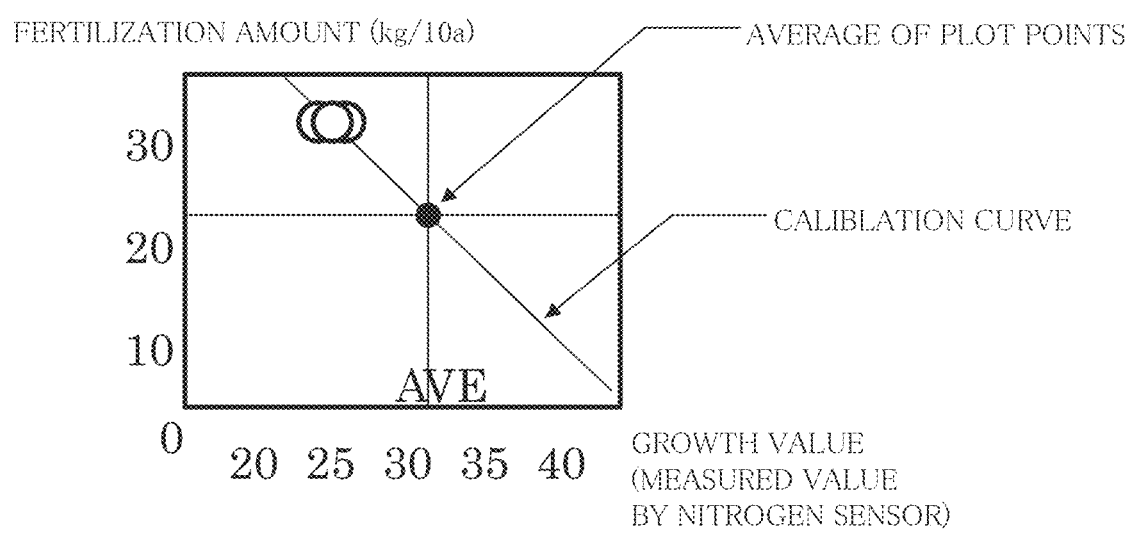
FIG. 19 illustrates an example of the calibration curve.

The average of the growth values of the three points is set on the lateral axis, and the average of the fertilization amounts is set on the vertical axis, whereby a second point is obtained. Finally, a line passing through the first point and the second point is obtained as the calibration curve. An example of the calibration curve obtained thus is illustrated in FIG. 19.

Example of Processing

Figure 20:
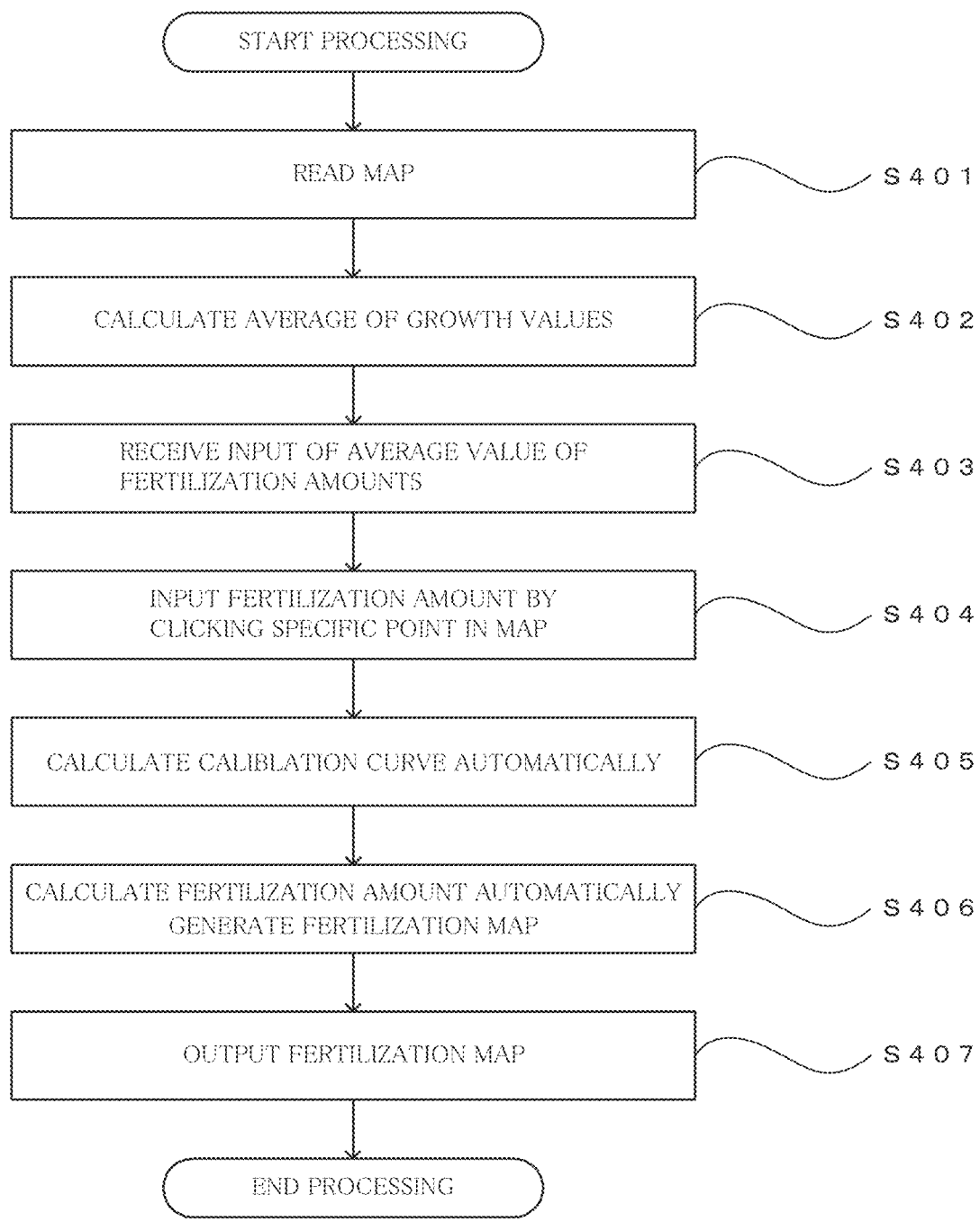
FIG. 20 is a flowchart illustrating an example of processing.

The following describes an example of the processing in FIGS. 16 to 19. FIG. 20 is a flowchart showing a procedure of this processing. A program for executing the processing in FIG. 20 is stored in an appropriate storage medium and is executed by the fertilization design device 100 in FIG. 2.

First, the map as illustrated in FIG. 16 is read and is displayed (step S401). Then, an average of the growth values is calculated (step S402), and an average of the fertilization amounts input by a user is received (step S403).

Next, one or more points on the map designated by the user are received (step S404). In the case illustrated in FIG. 18, at least two points are received. In response to reception in steps S403 and S404, a calibration curve as exemplified in FIG. 17 or 19 is generated (step S405).

Thereafter, a fertilization map is generated on the basis of the obtained calibration curve (step S406), and data of the generated fertilization map is output (step S407).

Other Matters

The calibration curve may be generated by using growth data of evaluated growth levels of plants. In this case, the lateral axis for the calibration curve is set for representing the growth data. This embodiment can also be used in this case. The growth data is obtained on the basis of results of evaluations of growth conditions, such as of a stem, a leaf, a flower, and a fruit, performed by a sensor or another unit. The calibration curve that is generated by using the growth data can also be used in the fifth embodiment and in the sixth embodiment.

Fifth Embodiment

Fertilizer may be packed into a bag and be offered in a sales unit of several tens of kilograms, such as 20 kg or 50 kg. Fertilizer, once opened, can become damp and deteriorated, and therefore, it is desirable to use up all the fertilizer each time and avoid long-term preservation.

The generated fertilization map enables understanding the amount of fertilizer to be applied in a target field or the total amount of the fertilizer for all fields. For example, a calculated amount of fertilizer to be used in a field may be 510 kg. In this case, if a 50-kg pack of fertilizer is prepared, it may be desired to reduce the total amount of the fertilizer to be used to 500 kg to avoid waste of the fertilizer. The target field may be one or plural.

In this situation, the calculated total amount of the fertilizer required in the target field may be adjusted by parallelly moving the calibration curve as illustrated in FIG. 6, 17, or 19, in a vertical direction. For example, the calculated total amount of the fertilizer to be used is decreased by parallelly moving the calibration curve in a lower direction. In contrast, the calculated total amount of the fertilizer to be used is increased by parallelly moving the calibration curve in an upper direction.

In one example, the calculated necessary total amount of the fertilizer may be 510 kg, on the basis of a calibration curve that is generated without considering the total amount of the fertilizer prepared. In this case, a desired total amount of the fertilizer to be used may be 500 kg, and thus, the fertilizer may be short by 10 kg. In this situation, the calibration curve is moved in parallel in the lower direction by a slight amount to adjust the calculated necessary total amount of the fertilizer to 500 kg. This equalizes effects of the deficiency to the whole field and minimizes negative influences due to the slight deficiency of the fertilizer (for example, a smaller yield of crops than expected).

In another example, the calculated necessary total amount of the fertilizer may be 480 kg, on the basis of a calibration curve that is generated without considering the total amount of the fertilizer prepared. In this case, a desired total amount of the fertilizer may be 500 kg, and thus, 20 kg of the fertilizer is excess. In this situation, the calibration curve is moved in parallel in the upper direction by a slight amount to adjust the calculated necessary total amount the fertilizer to 500 kg. Thus, the effect of excess of the fertilizer is equalized in the whole field.

Specifically, the following processing is performed. The following describes a case of using a calibration curve in which a content of nitrogen is set on the lateral axis and a fertilization amount is set on the vertical axis. First, a calibration curve is calculated without limitation to the total amount of fertilizer. The calibration curve is used to calculate a fertilization amount in each section of a field. The fertilization amount at a target position is obtained from the calibration curve on the basis of a nitrogen content of each section of the field. Thus, a fertilization map is obtained. Next, a total amount (calculated value) of the fertilizer in the field is calculated on the basis of the obtained fertilization map.

The necessary total amount (calculated value) of the fertilizer is calculated on the basis of the calibration curve that is generated without limitation relating to the total amount of the fertilizer prepared. Then, a total amount (desired value) of the fertilizer, which is in accordance with the convenience of the user, is input to the fertilization design device 100.

The calibration curve correction unit 117 compares the calculated value with the desired value. If the calculated value is greater than the desired value, the calibration curve is moved in parallel in the lower direction (moved in parallel in the lower direction along the vertical axis) so that the calculated value will be approximately equal to the desired value. The degree of coincidence of the calculated value and the desired value is determined whether the difference therebetween is not greater than 3%, for example. This determination condition is appropriately set.

The parallel movement of the calibration curve in the lower direction decreases the fertilization amount in the whole area of the field, thereby decreasing the calculated value close to the desired value.

Otherwise, if the calculated value is less than the desired value, the calibration curve is moved in parallel in the upper direction (moved in parallel in the upper direction along the vertical axis) so that the calculated value will be approximately equal to the desired value. The parallel movement of the calibration curve in the upper direction increases the fertilization amount in the whole area of the field, thereby increasing the calculated value close to the desired value.

Thus, the calibration curve is moved in the upper direction or the lower direction by the calibration curve correction unit 117 so that the total use amount of the fertilizer will be in conformity with the amount desired by the user. Thereafter, a definitive fertilization map is generated on the basis of the calibration curve thus obtained.

Sixth Embodiment

Among crops, some crops may be deteriorated in quality or may not be able to be harvested by bending down of stems due to heavy weights of fruits just before harvesting. To avoid this problem, fertilizer in an amount less than a calculated value may be applied at a place with high growth potential. This method is implemented by adjusting the inclination of the calibration curve.

As illustrated in FIG. 4, the calibration curve inclines downward in the right direction and has a negative inclination. In the above-described case, the inclination of an obtained calibration curve is adjusted by lowering a right end of the calibration curve and raising a left end of the calibration curve. Thus, fertilizer in a smaller amount is applied to a place with high growth potential, whereas fertilizer in a greater amount is applied to a place with a low growth potential. Such adjustment of the calibration curve may be effective for some crops. This adjustment of the shape of the calibration curve is performed by the calibration curve correction unit 117.

Other Matters

The embodiments described above can be used in combination.

Advantages

The advantages of the invention include the fact that intuition based on the experience of a user, which can be difficult to be expressed technically, can be expressed with a simple device configuration; the fact that, since map data is used, users can use the device with simple and easily understood operation; the fact that, since numerical data can be converted into map data, a variety of databases can be referenced; and the fact that versatility and operability can be further increased by using the device together with GNSS position specification devices.

INDUSTRIAL APPLICABILITY

The invention can be used for examining and calculating the fertilization amount of fertilizer to be applied to a field.

What is claimed is:

1. A fertilization design device configured to calculate a fertilization amount of a field to be fertilized, the fertilization design device comprising:
   a database reception unit configured to receive one or both of growth data that indicates a growth level of plants in the field and soil data that indicates plant growth potential of soil in the field and to receive position data as position coordinate information of the field;
   a designated position reception and retrieval unit configured to receive a freely selected position designated by a user and to retrieve information of the freely selected position from the position data;
   a user input fertilization amount value reception unit configured to receive a fertilization amount value freely set by the user for the freely selected position or for a range including the freely selected position, the information of the freely selected position or the range retrieved by the designated position reception and retrieval unit; and
   a calibration curve generation unit configured to generate a calibration curve, based on one or both of the growth data and the soil data, the position data, and the fertilization amount value, the calibration curve having a lateral axis representing the growth data or the soil data and having a vertical axis representing the fertilization amount in a two-dimensional coordinate system.

2. The fertilization design device according to claim 1, wherein multiple plot points are determined in the two-dimensional coordinate system on the basis of one or both of the growth data and the soil data at a specific position and on the basis of a fertilization amount at the specific position, and a line that fits to the determined multiple plot points is obtained as the calibration curve.

3. The fertilization design device according to claim 2, wherein one of the plot points is obtained on the basis of an average fertilization amount in the field.

4. The fertilization design device according to claim 1, further comprising a calibration curve correction unit configured to perform parallel movement or change in an inclination or both of the calibration curve in accordance with a total amount of fertilizer to be applied to the field.

5. The fertilization design device according to claim 4, wherein the calibration curve is moved in parallel in a lower direction in a case in which the total amount of the fertilizer to be applied is less than a total amount of the fertilizer obtained from the calibration curve generated by the calibration curve generation unit, and the calibration curve is moved in parallel in an upper direction in a case in which the total amount of the fertilizer to be applied is greater than the total amount of the fertilizer obtained from the calibration curve generated by the calibration curve generation unit.

6. The fertilization design device according to claim 1, further comprising:
   a fertilization map generation unit configured to generate a fertilization map, based on one or both of the growth data and the soil data, the position data, and the calibration curve.

7. The fertilization design device according to claim 1, wherein the database reception unit receives map data generated on the basis of one or both of the growth data and the soil data and the position data.

8. The fertilization design device according to claim 1, further comprising:
   a data conversion unit configured to convert one or both of the growth data and the soil data, which are numerical data, and the position data, into map data.

9. The fertilization design device according to claim 1, further comprising:
   a GNSS position specification unit configured to receive a navigation signal from a navigation satellite and specifies a position,
   wherein the user input fertilization amount value reception unit receives a fertilization amount value freely set by the user for a position specified by the GNSS position specification unit or for a range including a position specified by the GNSS position specification unit.

10. An agricultural tool having a fertilizer device, the agricultural tool configured to fertilize using a fertilization map output from the fertilization design device according to claim 1.

11. A method for calculating a fertilization amount of a field to be fertilized, the method comprising:
   receiving one or both of growth data that indicates growth potential of the field and soil data that indicates plant growth potential of soil in the field and receiving position data as position coordinate information of the field;
   receiving a freely selected position designated by a user and retrieving information of the freely selected position from the position data;
   receiving a fertilization amount value freely set by the user for the freely selected position or for a range including the freely selected position, the information of the freely selected position or the range retrieved in receiving the freely selected position and retrieving information of the freely selected position; and
   generating a calibration curve, based on one or both of the growth data and the soil data, the position data, and the fertilization amount value, the calibration curve having a lateral axis representing the growth data or the soil data and having a vertical axis representing the fertilization amount in a two-dimensional coordinate system.

12. A non-transitory computer recording medium storing computer executable instructions for calculating a fertilization amount of a field to be fertilized, the computer executable instructions that, when executed by a computer processor, cause the computer processor to:

receive one or both of growth data that indicates growth potential of the field and soil data that indicates plant growth potential of soil in the field and receive position data as position coordinate information of the field;

receive a freely selected position designated by a user and retrieve information of the freely selected position from the position data;

receive a fertilization amount value freely set by the user for the freely selected position or for a range including the freely selected position, the information of the freely selected position or the range retrieved in receiving the freely selected position and retrieving information of the freely selected position; and generate a calibration curve, based on one or both of the growth data and the soil data, the position data, and the fertilization amount value, the calibration curve having a lateral axis representing the growth data or the soil data and having a vertical axis representing the fertilization amount in a two-dimensional coordinate system.

* * * * *